(12) United States Patent
Rassmagin et al.

(10) Patent No.: US 11,006,495 B1
(45) Date of Patent: May 11, 2021

(54) ADVANCED MODULAR SYSTEMS FOR EVEN LIGHTING

(71) Applicants: Dmitrii Karpenko, Balakovo (RU); Yury Dudchenko, Balakovo (RU)

(72) Inventors: Igor Rassmagin, Balakovo (RU); Anton Nikonorov, Balakovo (RU); Dmitrii Karpenko, Balakovo (RU)

(73) Assignees: Dmitrii Karpenko, Balakovo (RU); Yury Dudchenko, Balakovo (RU)

( * ) Notice: Subject to any disclaimer, the term of this patent is extended or adjusted under 35 U.S.C. 154(b) by 0 days.

(21) Appl. No.: 17/036,473

(22) Filed: Sep. 29, 2020

(51) Int. Cl.
| | | |
|---|---|---|
| *H05B 45/20* | (2020.01) | |
| *H05B 45/10* | (2020.01) | |
| *H05B 45/325* | (2020.01) | |
| *H05B 47/165* | (2020.01) | |
| *H05B 47/155* | (2020.01) | |
| *H05B 47/16* | (2020.01) | |
| *H05B 45/345* | (2020.01) | |

(52) U.S. Cl.
CPC ............. *H05B 45/20* (2020.01); *H05B 45/10* (2020.01); *H05B 45/325* (2020.01); *H05B 45/345* (2020.01); *H05B 47/155* (2020.01); *H05B 47/16* (2020.01); *H05B 47/165* (2020.01)

(58) Field of Classification Search
CPC ........ H05B 45/00; H05B 45/10; H05B 45/20; H05B 45/325; H05B 45/345; H05B 47/00; H05B 47/10; H05B 47/16; H05B 47/165; H05B 47/155
See application file for complete search history.

(56) References Cited

U.S. PATENT DOCUMENTS

2007/0273290 A1* 11/2007 Ashdown .............. F21V 29/717
                                                                315/113
2013/0093325 A1*  4/2013 Scarpelli ................. F21V 5/007
                                                                 315/85

* cited by examiner

*Primary Examiner* — Jimmy T Vu
(74) *Attorney, Agent, or Firm* — Nadya Reingand; Yan Hankin

(57) ABSTRACT

The invention describes methods, systems, and devices used for lighting with controllable spectrum, thereby providing a desired true radiation, true spectrum, and a uniform light distribution across a target plane. Uniform distribution of light density is achieved by an uneven arrangement of light sources, positioned in a predetermined spatial relationship. Control of the radiation emitted from each one of the light sources is performed via a controller interface connected to the system. The light sources, preferably LEDs, are installed onto a circuit board, each circuit board of a system being the same, each system comprising one or more circuit boards with light sources. The entire system of light sources is programmable for daily and long-term cycles, per user or situational preference.

20 Claims, 15 Drawing Sheets

ADVANCED MODULAR SYSTEMS FOR EVEN LIGHTING

FIELD OF THE INVENTION

The present invention relates to lighting devices used to efficiently and evenly illuminate areas above ground and below water.

BACKGROUND OF THE INVENTION

Current LED luminaires that are designed for uniform lighting comprise designs with uniform arrangement of light sources. This leads to the appearance of hot spots, especially under the center of light sources. The luminosity on these hot spots can be fifty percent greater than the luminosity at the edges of the luminary. This effect is inherent to all currently known luminaires with evenly distributed elementary emitters of same type, including those comprising fluorescent tubes.

FIG. 1 illustrates the difficulty of achieving a full spectrum of visible light using only RGB LEDs.

At present, most color displays produce an image using three color channels (RGB). Using this method, some of the brightest color shades, the so called "extra-spectral" shades, cannot be produced, including, e.g., certain types of magenta. Hereinafter we shall call these colors "magenta," since this color is one of the basic color components used in color printing (CMYK). These "extra-spectral" colors that are available in print are completely missing in devices which produce color using RGB channels. The "extra-spectral" colors comprise approximately 20% of all colors distinguished by the human eye. Therefore the experts estimate the color range that can be produced using RGB is acceptable, but far from ideal.

The Basic Even Advanced Modular lighting System (BEAMS) luminaires of the present invention solve a number of prior art problems including but not limited to those mentioned above. Luminaires built according to the principles of the present invention can be beneficial in various fields of science, culture, leisure, and industry, and particularly including agriculture, such as vertical greenhouses and bodies of water. The principles for constructing devices and systems comprising LEDs according to the present invention are described herein.

SUMMARY OF THE INVENTION

The present invention provides for full spectrum LED lighting systems and devices illuminating an area above ground or an area below water, such as but not limited to aquariums and greenhouses.

In some aspects, the present invention describes a lighting device, comprising a driver assembly comprising five or more drivers, wherein the number of said drivers is at least equal to the number of total LED channels, at least five unique LED channels, a microcomputer, a microcontroller, and one or more LED assemblies connected to said driver assembly, each of said one or more LED assemblies comprising a single circuit board, at least five LED emitters, each of said at least five LED emitters emitting a unique wavelength relative to all other LED emitters of said at least five LED emitters, each of said at least five LED emitters being positioned around a center of said circuit board, and a controller interface installed on said microcomputer, said microcomputer transmitting to said microcontroller directions for controlling one or more of said five or more drivers of said driver assembly, said controller interface providing a control of a uniform spectrum distribution of said lighting device, said controller interface providing for modifications of pulse width and period of light emitted by any one of said at least five LED emitters, and/or the electric current, with using of hybrid dimming technology, on any one of said at least five LED emitters.

In some aspects, each of said one or more LED assemblies comprises 12 unique LED emitters. In some aspects, each of said two or more LED assemblies comprises 17 total LED emitters.

In some aspects, the device further comprises a non-emitting center, said non-emitting center being between 50 and 200 millimeters in width.

In some aspects, said single circuit board comprises an array of seat locations for said LED emitters, each seat location comprising a set of 3 spaced segments, said 3 spaced segments being soldered to corresponding LED pads, wherein outer segments of said 3 spaced segments comprise power contacts for a given one of said at least five LED emitters, and wherein inner segments of said 3 spaced segments are electrically neutral pads.

In some aspects, the microcomputer comprises a Linux-core based operating system.

In some aspects, the controller interface provides for a modification to a daily cycle. In some aspects, the controller interface provides for a modification to a long-term cycle.

In some aspects, the controller interface provides an upper portion and a lower portion, said upper portion illustrating current spectral setting out of all set spectrums from a given cycle, said lower portion graphically displaying a change in an amount of radiation emitted between each consecutive one of all set spectrums from a given cycle.

In some aspects, the controller interface provides an overall true optical radiation value, said overall true optical radiation value corresponding to a given set spectrum.

In some aspects, each one of said LED assemblies comprises an absence of jumpers.

In some aspects, the device further comprises flat power cables, said flat power cables comprising conductors, said conductors having a width of 700 microns and a thickness of 100 microns. Essentially, the system should preferably have a width and thickness sufficient to ensure acceptable losses due to the resistance of the conductors.

In some aspects, the controller interface provides a total true optical radiation amount in micromoles of photons, said total true optical radiation amount resulting from a combination of wavelengths emitted as created in a given user-set spectrum.

In some aspects, the controller interface provides for a setting of daily cycles. In some aspects, the controller interface provides for a setting of a long-term cycle, said long-term cycle comprising one or more daily cycles.

In some aspects, said hybrid dimming comprising pulse wave modulation (PWM) and constant current reduction (CCR). In some aspects, said PWM of said hybrid dimming occurs only in modes comprising near-zero amounts of radiation.

In some aspects, said LED emitters form a circular spaced area on each of said LED assemblies.

In some aspects, the invention further comprises a local connection setting, said local connection setting providing a connectivity to said device via said controller interface in an absence of internet access.

In some aspects, the invention is a system of lighting devices, the system comprising two or more lighting devices according to claim 1, said two or more lighting devices being connected, said two or more lighting devices having a hierarchy.

BRIEF DESCRIPTION OF THE DRAWINGS

The present invention will be more fully understood with reference to the accompanying drawings, in which:

FIG. 6A shows relative luminous intensity based on its angle for red, green, blue, and white light (i.e., RGBW). FIG. 6B shows relative luminous intensity based on its angle for red, green, blue, and amber light (i.e., RGBA).

DETAILED DESCRIPTION OF THE PREFERRED EMBODIMENT

Figure 1:
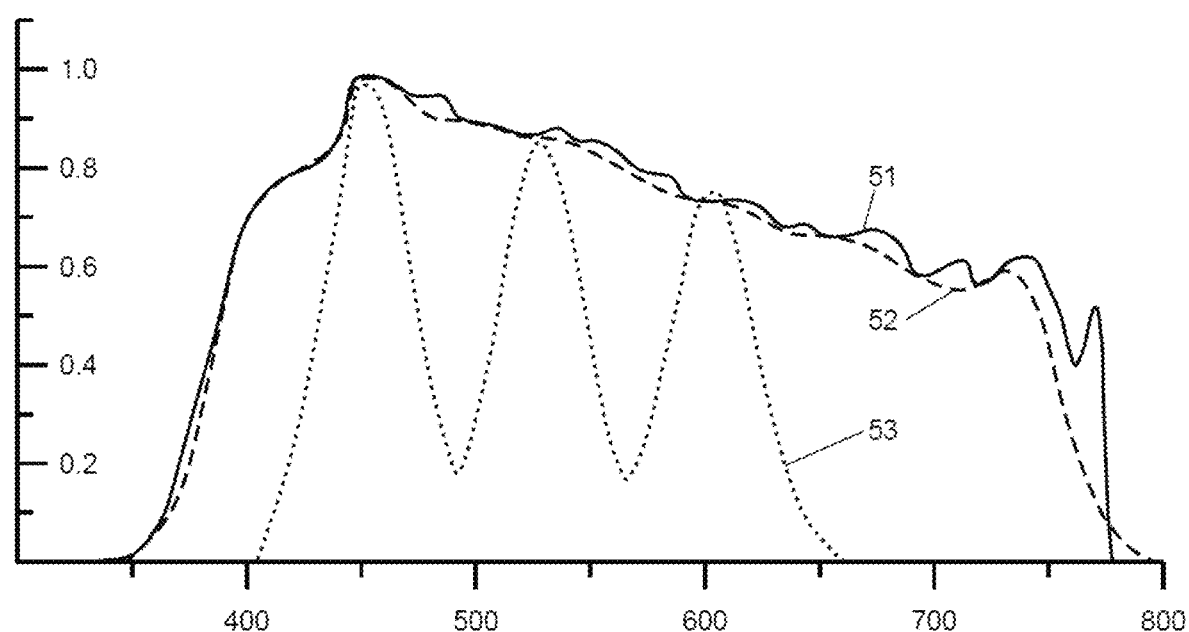
FIG. 1 illustrates the difficulty of achieving a full spectrum of visible light using RGB LEDs only, by comparing the spectrums available to particular light-emitting devices.

BEAMS ("Basic Even Advanced Modular System") luminaires, i.e. the present invention, as described herein, solve a number of issues existing in the prior art. Luminaires built according to the principles of the present invention are beneficial in various fields of science, culture, leisure, and industry, including agriculture (e.g., vertical greenhouses, bodies of water). The principles for constructing luminaires according to the present invention is described herein.

The objects of the invention are as follows:

1. Creating a uniform distribution of light flux density on an illuminated plane. The solution comprises an uneven arrangement of light sources, employing a diffuser and a reflector with a Lambertian reflection pattern for obtaining evenly scattered light along the target plane, thus creating the uniform distribution.

2. Creating a target/desired spectrum and a target/desired instantaneous radiation. Control of radiation emitted from high-power LEDs is achieved basically without using PWM (pulse wave modulation).

3. Providing an LED assembly comprising an ensemble of circuitry solutions and lighting materials.

4. Providing a controller interface for programming daily and long-term cycles of varying spectra adjustable, manageable, and automatable. Logical controls are provided for controlling the spectrum and the amount of radiation. An intuitive and powerful controller interface is provided. The controller contains a computer with a Linux-core based operating system, wherein a user may control said computer via the controller interface.

5. Each lamp (i.e., device, light system) comprises a set of compact light sources (i.e., LED assemblies), joined in a linked chain and connected to the appropriate drivers, which in turn, are connected to the microcontroller, which in turn, is connected to the microcomputer. The number of LED assemblies in the linked chain depends on the number and types of driver integrated circuits used. The lamp may contain one or more of said linked chains of LED assemblies. The whole chain is controlled synergistically via the software (controller interface) of the present invention.

Object 1. Creating a Uniform Distribution of Light Flux Density on an Illuminated Plane.

Achieving a uniform distribution of light flux density over the illuminated area (i.e. an illuminated plane) is of significant practical importance. Such uniform distribution is necessary at every point on the illuminated plane, to successfully avoid unnecessary bright spots (i.e., hot spots). For example, in greenhouse lighting, it is customary to measure the illumination of the greenhouse based on the least illuminated areas of the greenhouse. Thus, e.g., all hot spots are considered as energy-wasting areas.

The principles of the arrangement of the LED assemblies should be calculated based on the ensemble of the spatial distribution of the light of all LEDs on the particular assembly. This task is complicated by the diffusing nature of the reflection of the reflector. The present invention's resulting distribution patterns were examined using spectrophotometers to confirm a uniform (i.e. even) distribution along the target surface. The sums of intensities measured at various consecutive and non-consecutive points along the target surface (or target plane) were equal, with an accuracy of +1-10 percent. That is, Intensity1, at point 1 along the target plane, equaled Intensity2, at point 2 along the target plane, which also equaled Intensity3, at point 3 along the target plane, and so on ($I_1=I_2=I_3$ ... with a deviation of 10% or less, across all such points which span the target plane).

To obtain the uniform distribution of illumination achieved by the present invention, the light sources (i.e. each individual LED assembly) are arranged based on their light intensity curve, i.e., the spatial distribution of the light flux density of each light source. When using separate LEDs, or dense LED assemblies, FIG. 2 shows an exemplary preferred structure.

Figure 2:
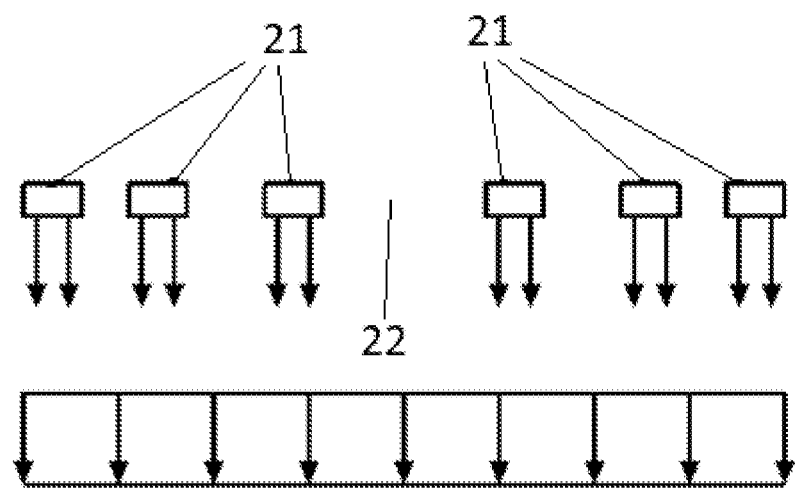
FIG. 2 exemplifies how the central area of the lighting structure does not comprise an LED (i.e. the central area is a non-emitting area, or a non-LED area), according to the present invention.

As shown in FIG. 2, the central area of the lighting structure does not comprise an LED (i.e. the central area is a non-emitting area, or a non-LED area because it does not emit any light), while surrounding points (i.e., LEDs 21) do. The center area of the lighting structure, which is also referred to herein as a non-emitting center 22, is preferably 50 to 200 millimeters in width. This is one example feature of the "uneven" arrangement of aspects of the present invention.

Preferably, LEDs with wide spatial distributions of their emitted light, and LEDs having the same focal length should be used in a given luminaire or LED assembly. Such LEDs are produced, e.g., by Lumileds, in their Luxeon C line. Unfortunately, however, a part of the Luxeon C line is not preferred for several setups. For example, LEDs having a peak wavelength near 660 nm from the Luxeon C line, i.e., LEDs having peak wavelengths which are essential for agricultural organisms (e.g., greenhouses), have very low efficacy. This low efficacy is nearly 2 times less than the preferred LEDs in the given class—manufactured by OSRAM. The Luxeon C line also has only one violet LED, having a peak wavelength of no less than 420 nm. The present invention allows for the adjustment of the true radiation of LEDs such that the same type of LED assembly may be used throughout the luminaire for achieving the different results. Otherwise, several types of lamps would be required to achieve desired settings for different targets (e.g., bloom or biomass increasing), as it is customary to do in modern greenhouse. Further due to the preciseness required in positioning the LED emitters such that they produce a uniform distribution, determining the positions of each LED emitter is complicated by the following: (1) different sizes of the housings of the LED emitters; (2) different focal length of the primary lens of the LEDs; (3) different counts of the LEDs, as necessary for achieving the target amount of radiation of each part of the resulting spectra; and (4) different widths of the spatial distribution of the light emitted by the various LEDs. In view of these complications, the exact placement of the LED assemblies inside of the luminaire is hard to determine by calculations. However, since the target plane is not required to be near the LED assembly, and due to the reflector structure, noticeable reductions of the spectrum unevenness are possible. Furthermore, the use of the diffuser with a chaotic mixing of the light also will noticeably decrease resulting spectrum unevenness. General rules for LED placement according to the present invention are as follows: (1) The smallest possible area should be used as the LED placement area of each LED assembly; (2) The distance from the plane of the LED assembly to the plane of the diffuser should be, preferably, no less than the distance between the optical centers of the outer LEDs of each LED assembly; (3) Evenly distribute same LEDs over the LED assembly such that all same LEDs are equidistant from one another; and (4) Those LED emitters having a tighter spatial distribution of their radiation should be installed near the geometrical center of the LED assembly. Due to the point nature of LEDs, it is further useful not only to uniformly distribute the illumination along the illuminated plane, but also to avoid any hot spots from any individual LED assembly or LED emitter. High-quality high-transmittance diffusers based on PET films (i.e. PET film diffusers) are used to further combat any hot spots. The uniformly scattered/diffused distribution of light achieved by the present invention increases the productivity and growth rate of photosynthetic organisms by up to 20 percent.

In order to obtain even further uniform distribution of radiation, a reflector should be mounted in the luminaire, wherein the reflector has a reflection pattern similar to a Lambertian reflection pattern.

Thus, the general rules for constructing an LED assembly according to the present invention are as follows:

1. All LED assemblies in a particular type of luminaire should be the same.

2. Each LED assembly comprises all the LEDs necessary for building the entire ensemble of any target spectra, with at least one LED per control channel.

3. If there is more than one LED in a given control channel, these LEDs should be placed on the circuit board as equidistant from one another as possible.

4. The area occupied by the LEDs on the board should be minimal. That is, the LEDs should be placed as densely (i.e. as centrally) as possible.

Figure 7:
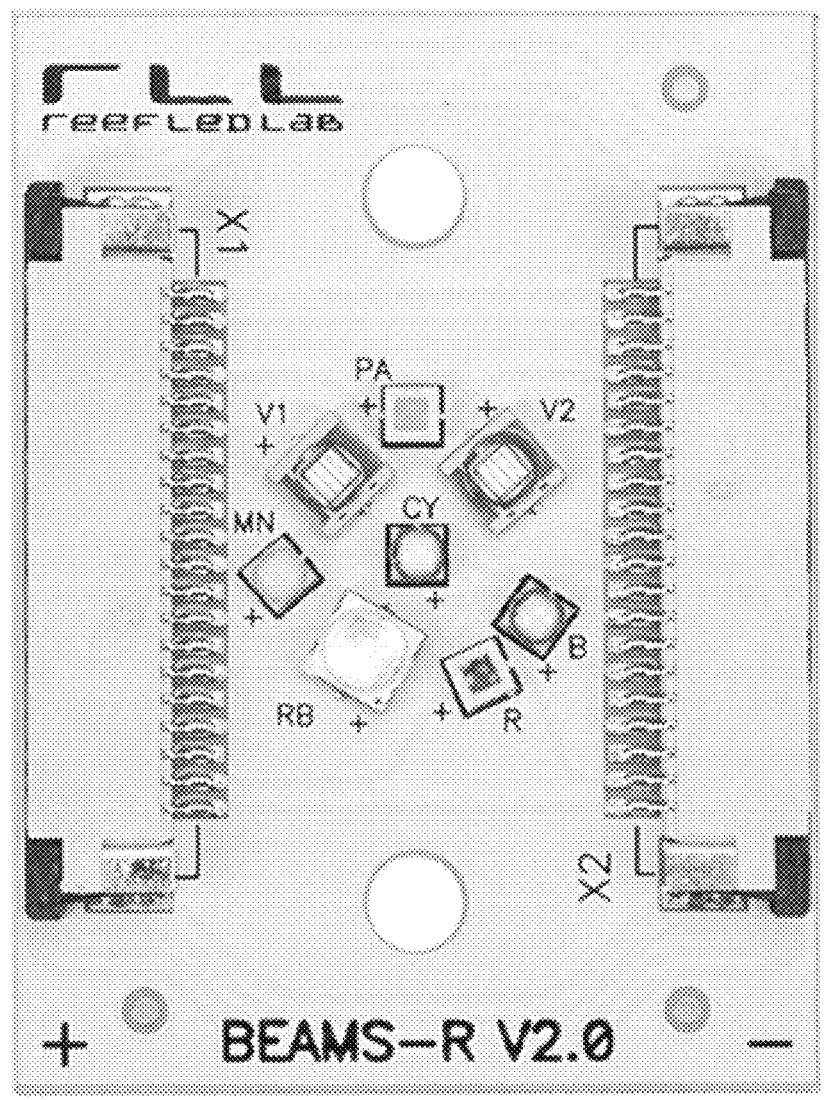
FIG. 7 shows an exemplary LED assembly configuration, the exemplary LED assembly corresponding to use in marine (i.e. saltwater) aquariums.
Figure 8:
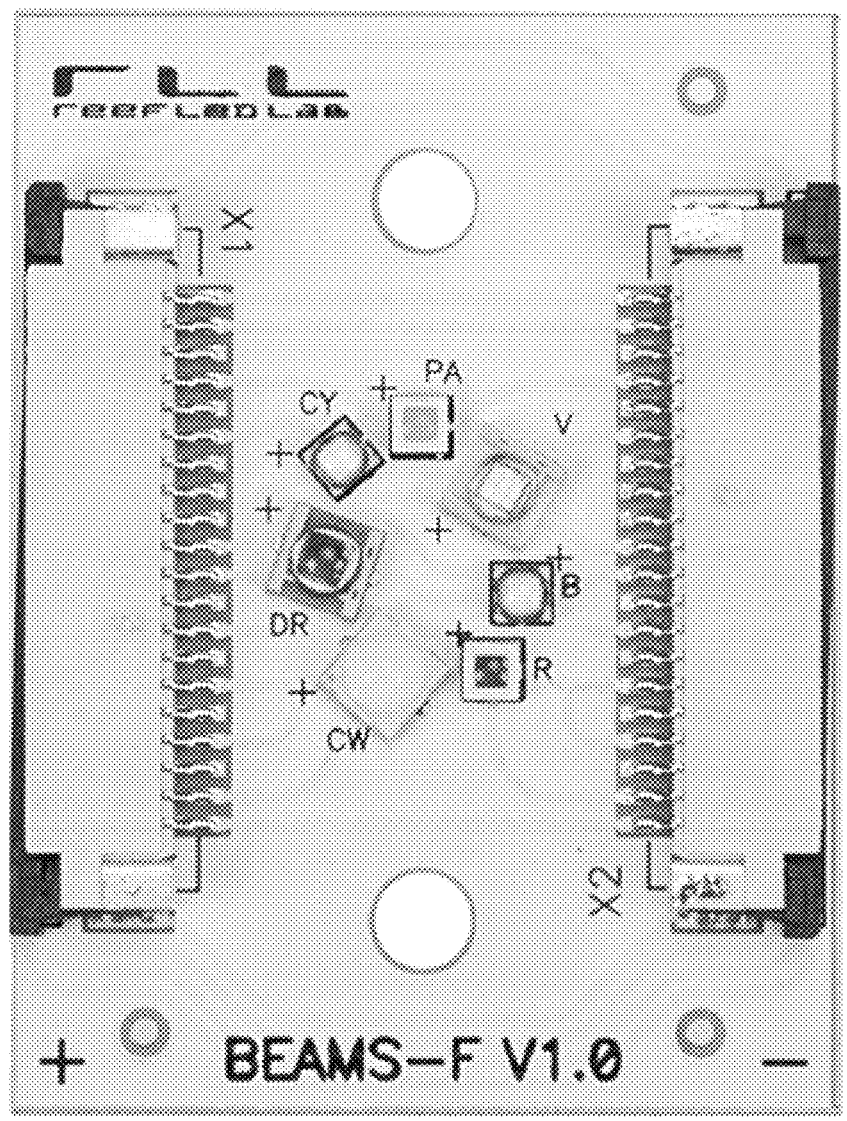
FIG. 8 shows another exemplary LED configuration, for use in freshwater aquariums.

5. When designing the LED assembly, the physical parameters of the lamp should also be considered, for example, the type of LEDs and the type of material of the printed circuit board. The maximum possible density of the LEDs depends on the thermal conductivity of the LED housing and the integral thermal conductivity of the LED circuit board. The higher the thermal conductivities of the components comprising the LED assembly, the more densely the LEDs on the LED assembly can be installed. Exemplary dimensions of the embodiments shown in FIGS. 7 and 8 are: The area occupied directly by LEDs in both boards has a diameter of 11 millimeters. For the embodiment shown in FIG. 13, the same diameter is 22 millimeters. The exemplary dimensions are for illustrative purposes only and do not limit the scope of the present invention. In general, the denser the LED assembly, the better, especially without taking into account the limiting physical factors described herein.

Additional rules for designing LED lamps, that using the LED assemblies according to the present invention comprise the following:

1. The geometric centers of the LED assemblies in the luminaire should be located on a straight line, said straight line being an axial line from the center of the lamp to its edge.

2. To obtain a uniform distribution of radiation over the illuminated surface, an uneven arrangement of LED assemblies is required.

3. The greatest distance between neighboring LEDs assemblies is that distance between central LED assemblies of the lamp, and the shortest distance between neighboring LEDs is that distance between peripheral LED assemblies of the lamp, wherein the distance between LED assemblies decreases when approaching either end of the lamp. The smallest distance will be between the last pair of LED assemblies at each end of the luminaire.

4. The greater the average distance between the LED assemblies, the further the that the target plane will be located, where there will be said uniformity of the density of the radiation. The distance between lamp and target plane in most cases should be not less than the maximum distance between neighboring LED assemblies of the lamp.

In addition to the above, a device according to the present invention, which may comprise several LED assemblies, should further comprise a competent optical system including a reflector with a Lambertian reflection pattern (i.e. diffuse reflection), as well as a diffuser, said diffusor having a diffuse dispersion pattern.

Object 2. Creating a Target/Desired Spectrum and Instantaneous Brightness.

Figure 3:
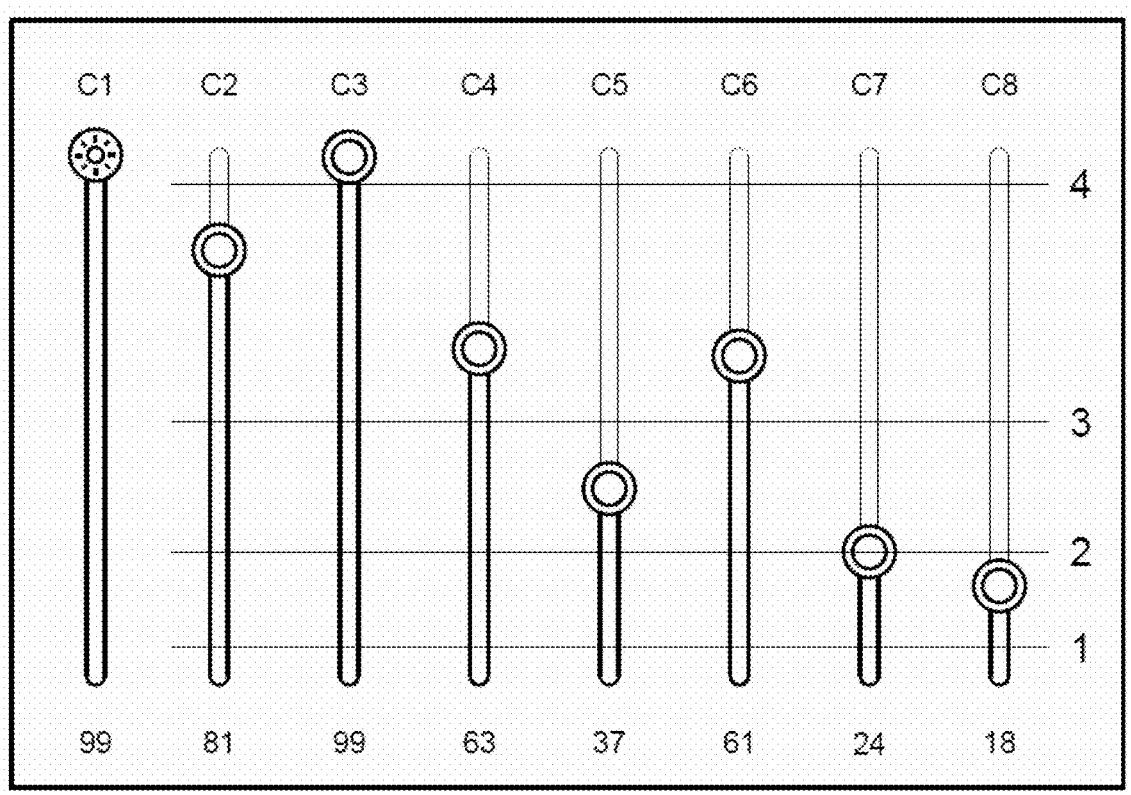
FIG. 3 considers the instantaneous spectrum of an example luminaire if the brightness of each of the LEDs is set using PWM.

The target spectrum is formed via multi-channel LED luminaires, wherein each different LED channel may be set to a specific brightness to achieve a desired result. When using high-power LEDs, PWM is typically used; however, PWM does not provide the proper spectrum. FIG. 3 considers the instantaneous spectrum of an example luminaire if the brightness of each of the LEDs channels is set using PWM.

In FIG. 3, the height of each column indicates the duration of the inclusion of that particular LED channel during an exemplary PWM cycle. The instantaneous spectrum of the luminaire as a whole varies over time. In the example of FIG. 3, at the time, indicated by line 1, all types of LED channels participate in the formation of the spectrum emitted by the lamp. At the time indicated by line 2, six types of LEDs are involved in the formation of the luminaire spectrum. At the time indicated by line 3, four types of LEDs are involved. At the time indicated by line 4, only one LED type is involved. While it may seem that, at line 1, the spectrum desired is obtained, it is not obtained. At this point, all 7 types of LED channels are operating, but all are emitting at full power. In order to achieve a desired spectrum, however, the channels should also emit at a particular strength/power, as provided and indicated under each of the bars corresponding to each type of LED channel. For this reason, a lamp employing PWM control of its LEDs is never able to provide the spectrum that a user indicates. The only exception comprises the special case where each LED channel is required to emit at full power, or each channel at zero power. The present invention allows the lamp to produce both the necessary spectra and the necessary brightness at every point in time that the luminaire is utilized.

Figure 4:
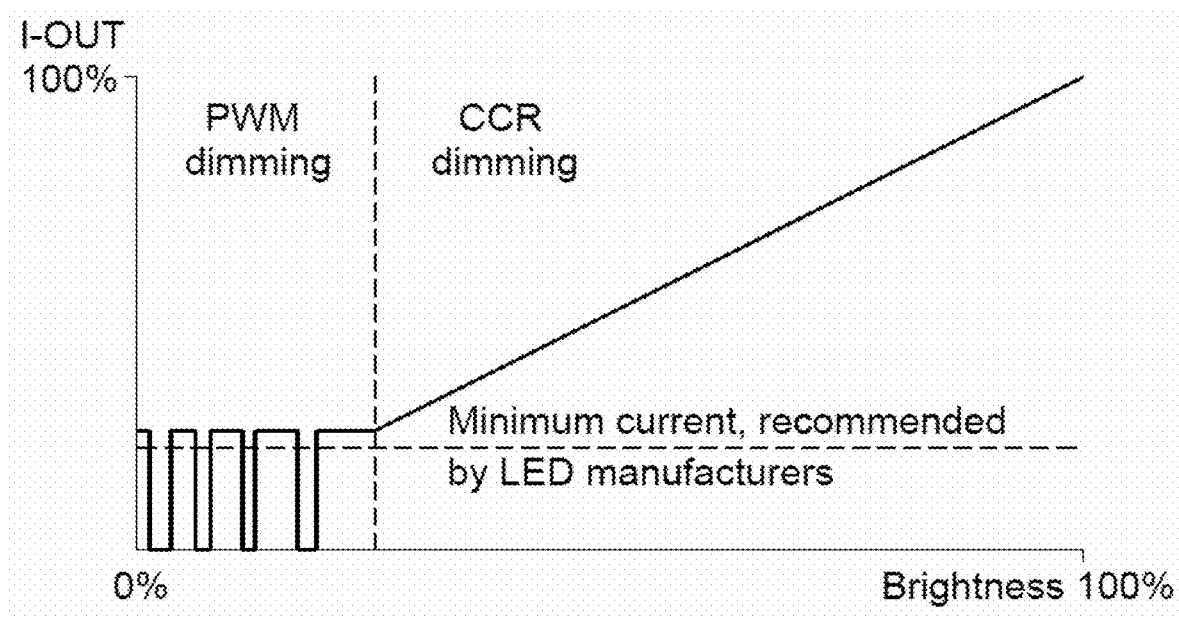
FIG. 4 illustrates hybrid dimming according to the present invention.

To control the range of devices according to the present invention, hybrid dimming is employed. Hybrid dimming is illustrated by the diagram shown in FIG. 4. In FIG. 4, hybrid dimming is shown as comprising both PWM and CCR (constant current reduction) for control of each LED channel. Except for radiation amounts which are in proximity to the minimum current recommended by LED manufacturers, CCR is employed for both dimming and brightening of the LEDs. The deviation from the exact value further depends on the precision of the setting of the current by the particular type of driver integrated circuit. Usually, this deviation is about 5% of the target current. Also typically, LED manufacturers will indicate the minimum current as 10% from the maximum LED current. If, for example, the maximum current in the LED channel is 1000 mA, the minimum real current, that should be provided by CCR, will need to be equal to 100+(0.05*100)=105 mA. For radiation amounts, which are below said minimum current recommend by LED manufacturers, PWM is employed instead of CCR. Such programming is provided via the hardware-software complex of the invention.

A problem existing in the prior art is that LED manufacturers do not guarantee the consistency of the spectrums emitted by LEDs having low current values, usually less than 10% from maximum current for particular LED type. For example, a 10% minimum current is indicated for high-power LEDs made by the company, OSRAM. The LED power supply system of the present invention reduces the analog current level via CCR (i.e., no PWM involved) to the minimum acceptable value suggested by the manufacturer of the LED used. Only after reaching the minimum acceptable value does the present invention begin to perform a reduction in the mean current by employing PWM. In practice, such hybrid dimming technically allows for any desired spectra to be formed without PWM. The lamp uses PWM only during initial stages of the daily cycle requiring dawn simulation and final stages requiring sunset simulation. In such cases, the light intensity is too low to be valuable for active, i.e. beneficial or practical, photosynthetic processes, and therefore PWM may be used during such periods without detracting from desired photosynthetic processes which provide the desired result.

The lack of PWM control required by the present invention via hybrid dimming also provides for a truer instantaneous brightness, rather than the average brightness as would be produced via PWM, of the lamp. Consider the instantaneous brightness of a lamp in the case of employing PWM. To adjust the amount of radiation from each LED channel, short flashes of varying durations are emitted, which occur at a frequency high enough that the flashes merge to the human eye, resulting in a seemingly continuous light having a certain brightness. This is also demonstrated in FIG. 5.

Figure 5:
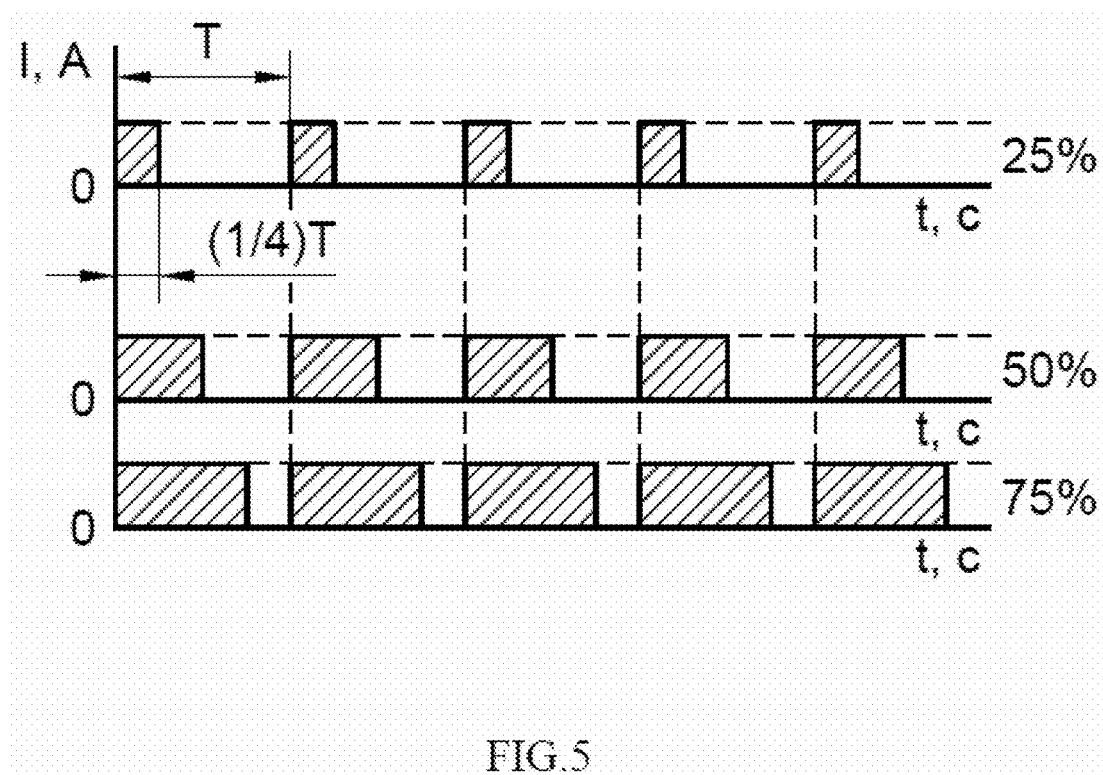
FIG. 5 shows various embodiments of PWM (pulse wave modulation), as discussed hereinbelow.

In FIG. 5, cross-hatched areas show times when current is applied to the LED. Three particular cases of setting the brightness are shown. 25% brightness occurs when the current goes through the LED 25% of the time, and 75% of the time, there is no current. 50% brightness occurs when the time of current supply and the time of its absence are equal. 75% brightness occurs when current is fed to the LED 75% of the time.

Lower repetition rates of the short flashes (i.e. low PWM frequencies) lead to the appearance of a flicker noticeable to the human eye. Many people can literally see the flicker, resulting in an unpleasant experience. Furthermore, the flickering of LEDs during PWM brightness control may lead to stripes visible on the video, said stripes being produced under such illumination. Even further, even high PWM frequencies, e.g., 1,500 Hz, near the limit for many current mass-produced PWM controllers, also present an issue in that they lead to significant decreases in the efficiency of light assimilation during photosynthetic processes.

Furthermore, the aspects of controlling the spectrum for greenhouses versus aspects for controlling the spectrum for aquaria, as well as versus aspects for other applications of the present invention, include separate criteria and protocols. In greenhouses, a goal of the spectrum emitted is to provide such lighting regimes that will increase photosynthetics and therefore more actively increase biomass, e.g., active blossoming or bearing of fruit. Such a lighting system may increasing accumulating in the plants the aromatic substances, nutrients, and vitamins. The visual appeal of a greenhouse, unlike that of aquariums, is relatively unimportant in relation to the environment's importance in providing an optimal photosynthetic habitat.

The task of an aquarium lamp according to the present invention is to form the best visual impression for the aquarium owner and appeal to the personal spectral preferences of the owner of the aquarium, while simultaneously providing a uniformly distributed spectrum intensity that is sufficient/optimal for photosynthetic processes required by the photosynthetics organisms within the aquarium. Typical spectra for marine aquariums contain the predominant amount of short-wave radiation that corals need for normal growth and staining. Typical spectra for freshwater aquariums more closely resemble the solar spectrum. Both types of environments' spectra are discussed in more detail further herein.

Other applications of the present invention include but are not limited to the formation of the necessary spectra and their true radiation for photographers, for video artists, and for the circadian rhythms of humans or animals, for activation and/or weakening of processes associated with circadian rhythms, which may be in demand in animal husbandry industries or sporting industries. Each of these applications comprise separate criteria and protocols. All of them, no matter how complex, can be successfully reproduced by the luminaires of the present invention, as constructed using the principles described herein.

The controller interface of the present invention, as described in more detail below, allows a user of the lamp to control the amount of radiation explicitly, without requiring the user to visually determine a resulting lighting spectrum, and also without requiring the user to understand how to program each individual LED channel separately to achieve a desired result. The main task of the user via the controller interface is to choose a spectrum set to their taste and also set to the amount of true radiation emitted by the chain of LED assemblies, a task which is facilitated by a specially designed and continuously updating expert server which aids the user in designing lighting cycles based on a growing collection of expert data relating to the control of luminaires via the software of the invention.

If there is no requirement for obtaining uniform illumination on the target plane, then a single LED assembly may be used, such that the lamp becomes a source of light on a certain smaller area, similar to a spotlight.

Object 3. Providing an LED Assembly Comprising an Ensemble of Circuitry Solutions and Materials.

Figure 6A:
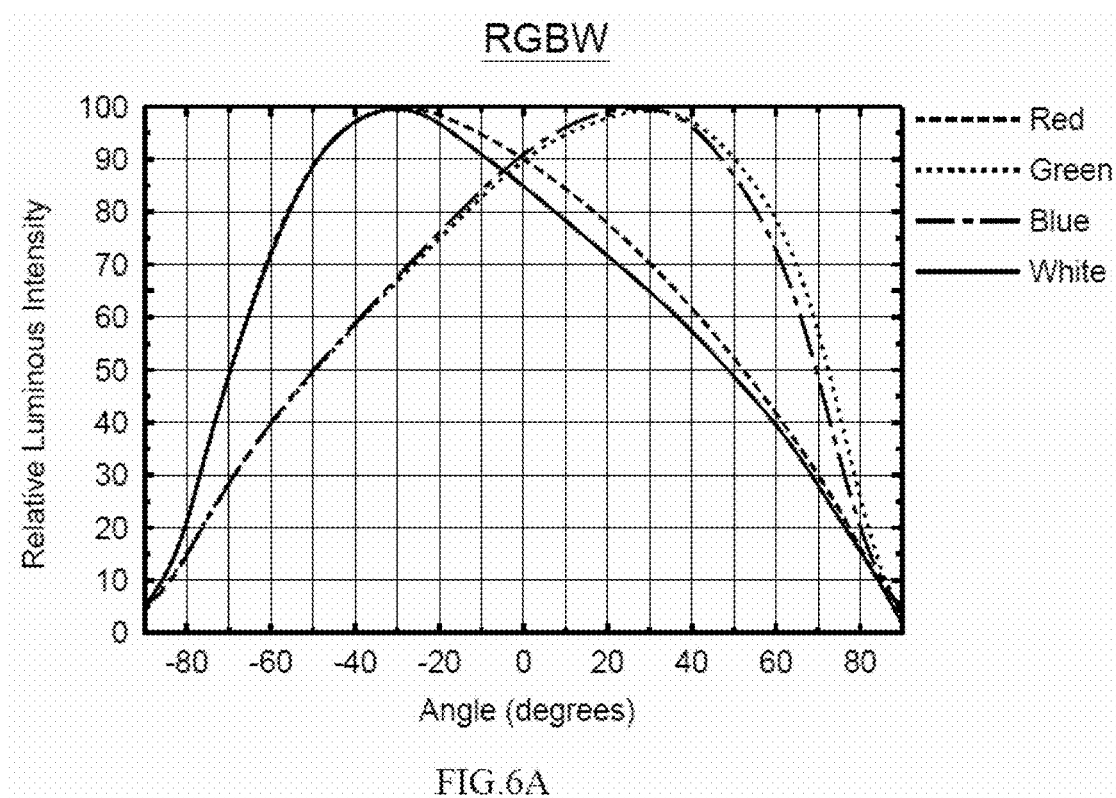
FIGS. 6A-6B illustrate, via two examples, how the use of a prior art LED assembly comprising several dissimilar crystals, covered by a uniting primary lens, leads to an unacceptably large deviation and spread of light radiation in solid angles.
Figure 6B:
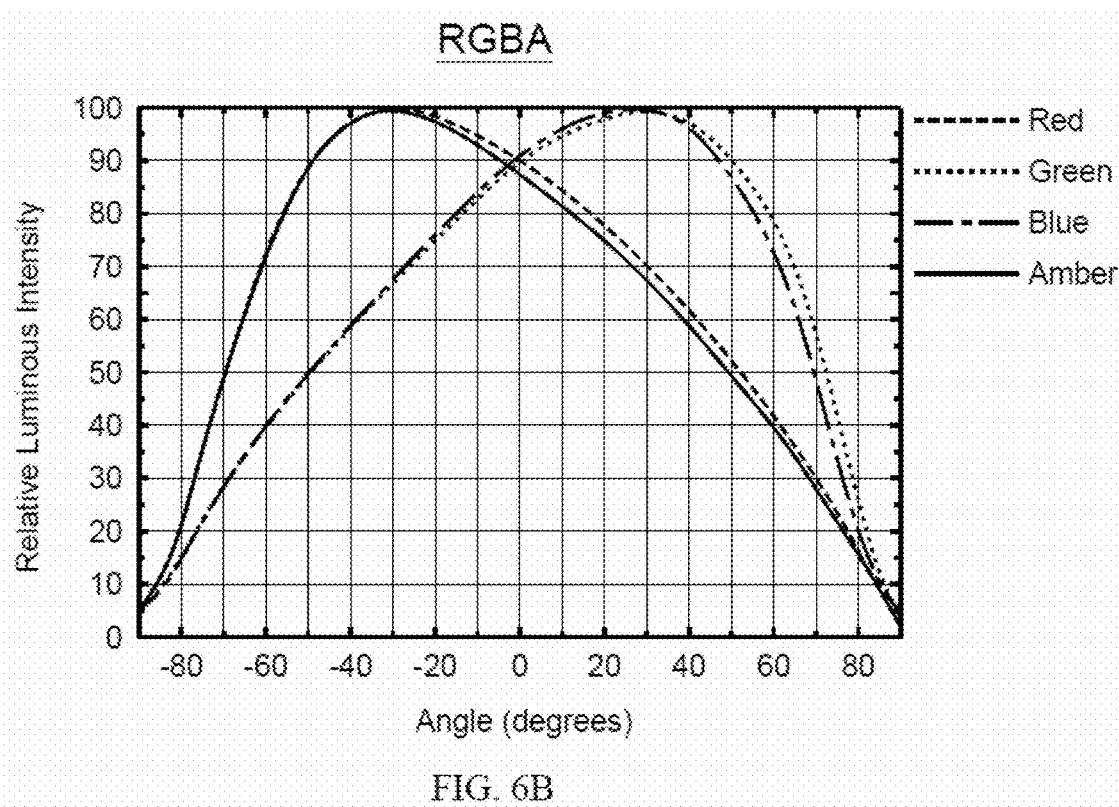

To obtain an identical and uniformly distributed spectrum over the entire illuminated area, it is necessary to use light sources, where each light source comprising all the LEDs involved in the formation of the desired spectrum. Every LED assembly that forms the light system should be identical to every other one of the LED assemblies forming that system. A set of LEDs is selected in accordance with the desired spectrum and the required accuracy for the formation of the target spectra. In this case, the smaller the distance between the LEDs, the smaller the gradient of the spectrum will be on the illuminated plane. The use of prior art optics, e.g., a united single primary optics lens for an entire LED assembly, comprising several dissimilar crystals leads to an unacceptably large spread of radiation in varying solid angles, as illustrated by FIG. 6. Such an unacceptably large spread does not occur from the lighting systems of the present invention for the reasons discussed herein.

Additionally, each LED assembly should comprise LED emitters having equal focal distances. If focal distances are different, then similar unacceptable results, described above, will occur.

Preferably, the primary optics of the LED emitters should distribute radiation in the widest possible angle to form optimal light mixing. Preferably, Lumileds LUXEON C Color line LEDs are used.

An overly dense arrangement of LEDs causes the heat flux density to sharply increase at the area of the LED assembly. Usually, the problem of heat removal from dense LED assemblies is solved by installing them on ceramic boards. Ceramic boards are expensive and furthermore contain issues during installation of such boards in lamps due to their fragility. The present invention therefore preferably employs non-ceramic boards, e.g., Polytronics TCB-C material (i.e., insulated metal substrate/thermally conductive board) for each of its LED assemblies. Such type of insulated metal substrates have a thermal conductivity of more than 50% of the thermal conductivity of aluminum oxide ceramics, an amount which is sufficient to ensure a comfortable thermal regime of LEDs in such dense assemblies as preferred and as typically required in practice. Other embodiments of the present invention comprise LED assemblies installed on ceramic boards comprising aluminum nitride (AlN).

FIG. 7 shows an exemplary LED assembly configuration, the exemplary LED assembly corresponding to use in marine (i.e. saltwater) aquariums. FIG. 8 shows another exemplary of LED assembly configuration, for use in freshwater aquariums. Both exemplary LED assemblies are made on metal boards having a high thermal conductivity, e.g., 12 W/mK. The exemplary LED assemblies shown in FIGS. 7 and 8 have identical dimensions of 30 mm×40 mm, but they comprise different sets of LED emitters, each LED emitters forming a particular LED control channel.

One significant difference between marine and freshwater aquarium LED assemblies is that the parts of the spectrum most in demand for such different types of aquariums are significantly different. Because most corals live in deep environments, where the solar spectrum is filtered by saltwater, and where the amount of the long-wavelength portion of the spectra is thus reduced, the corals have adapted to this form of the spectra. Therefore, for marine aquariums, the most common part of the ideal spectrum is blue (sometimes referred to as royal blue); therefore, in the LED assemblies for a marine aquarium, the most powerful LED, which may emit up to one third of radiation relative to the completely maximum radiation from one entire LED assembly, should be blue (royal blue), i.e., one or more LED emitters having a peak wavelength near to 450 nm. For freshwater aquariums, the most common part of the ideal spectrum comprises the wide mid-wave portion, which, in terms of humanly visible light, is white light. Therefore, in the LED assemblies for freshwater aquariums, the most powerful LED, which may emit up to one third of radiation relative to the completely maximum radiation from one entire LED assembly, is a LED, having a wide dominant part of the spectrum near 555 nm—i.e., a maximum sensitivity of the human eye. The color of such LEDs usually corresponds to the name, "Lime" or "Mint." Given the high cost of such LEDs, and for reducing the cost of the LED assemblies of the present invention, it is acceptable to use instead "Cool White" LEDs. In the case of greenhouses, LED assemblies should contain 660 nm radiation (which has the highest efficacy for most terrestrial plants) which adds up to one third of total radiation relative to the maximum radiation emitted from one entire LED assembly. LED assemblies for each respective type of environment and/or task will thus comprise varying LEDs ensembles based on a desired spectrum or on ideal spectrum principles, as exemplified here. Any additional desired effects of the lighting system may also be addressed via the structure of the LED assembly and the programming of the controller interface.

Each light system according to the present invention comprises a complete set of LED assemblies, each LED assembly being identical to every other LED assembly in the set, each LED assembly comprising the LEDs, that forming the channels necessary for the formation of the target radiation spectra, the individual LEDs on the LED assembly is installed as closely as possible. The examples in FIGS. 7 and 8 show a configuration of LED channels installed in a circular pattern on a metal board. The set of LEDs is selected not only by the wavelengths desired, but also by the amount of true radiation output desired. That is, the LEDs providing those parts of the desired spectrum that will be presented more often should be installed in larger numbers and comprising a larger percentage of the assembly.

The present invention includes light systems/devices comprising a set of LED assemblies, each LED assembly comprising at least five different LED emitters, each of the at least five different LED emitters emitting light having a separate spectrum (e.g., L1, L2, L3, L4, L5, etc.).

The wavelength range of commercially available LEDs having a single-element output power of at least 5 mW is 360 nm to 950 nm. Each wavelength range may be provided from a specific semiconductor material family. For example, UV emitting LEDs are based on GaN/AlGaN, emitting wavelengths of 240-360 nm. Near UV-green emitting LEDs are based on InGaN, emitting wavelengths of 395-530 nm, Yellow-green to red emitting LEDs are based on AlInP, emitting wavelengths of 565-645 nm, and deep-red to near-IR emitting LEDs are based on AlGaAs and GaAs, emitting wavelengths of 660-900 nm.

The principles of forming a set of LEDs dependent on the specific spectra desired may be illustrated by the following example. A lighting system embodiment comprises 6 LED assemblies, each of said 6 LED assemblies comprising 12 varieties (i.e. channels) of LED emitter types, each LED assembly having a total number of 17 installed LED emitters. Each of the LED assemblies has physical dimensions of 40 mm×60 mm.

The table below (Table 1) shows exemplary options for sets of LEDs on the LED assemblies that are designed for different environments, application and desired results, for example, marine aquariums, freshwater aquariums, and greenhouses. The fourth column shown in Table 1 corresponds to lighting a marine aquarium, the fifth column corresponds to lighting a freshwater aquarium, and the sixth column corresponds to lighting for a greenhouses. All three assemblies use identical types (i.e. channels) of LEDs, however the number of LEDs corresponding to each control channel is varied based on the desired output for each application. For example, since the green-type LED has the lowest efficiency of converting electric energy into light, it is preferably excluded entirely from LED assemblies made for greenhouses. Sets of LEDs may be installed as indicated in Table 1, the percentage of radiation for each channel may be specified by a user via the controller interface, and a preliminary visualization with high accuracy of the resulting spectrum that the luminaire(s) will produce is provided to the user, also via the controller interface. It is further noted, that, via the controller interface, the user is only required to adjust one slider regardless of the number of actual LED emitters installed on a given LED assembly of a given lighting system. The software of the system is able to convert the set sliders into a set of computer-readable instructions which control changes via the controller and/or microcomputer.

TABLE 1

Varying LED emitter counts per LED assembly, based on the different applications.

| channel # | Peak/dominant* wavelength | Visible color | Qt-ty saltwater | Qt-ty freshwater | Qt-ty greenhouse |
|---|---|---|---|---|---|
| 1 | 380-390 nm | Dark violet, almost UV | 1 | 1 | 1 |
| 2 | 400-410 nm | Violet | 1 | 1 | 1 |
| 3 | 420-430 nm | Bright violet | 1 | 1 | 1 |
| 4 | 440-445 nm | Dark blue | 2 | 1 | 2 |
| 5 | 455-460 nm | Royal Blue | 3 | 1 | 1 |
| 6 | 475-480 nm* | Blue | 3 | 1 | 1 |
| 7 | 495-500 nm* | Cyan | 1 | 2 | 1 |
| 8 | 520-525 nm* | Green | 1 | 1 | 0 |
| 9 | Near to 550 nm (wide spectrum) | Mint | 1 | 5 | 1 |
| 10 | Near to 595 nm (wide spectrum) | PC Amber | 1 | 1 | 1 |
| 11 | Red 630-635 nm* | Red | 1 | 1 | 2 |
| 12 | Deep red 655-665 nm | Deep red | 1 | 1 | 5 |
| | Total LED emitters per LED assembly | | 17 | 17 | 17 |

The example of constructing various spectra using the above set of LEDs for greenhouses (i.e., from Table 1) is provided here for an insight into the benefits a controlled spectrum, mutable based on the type of task. For vertical greenhouses, the system comprises the use of 4 devices, each device comprising 8 LED assemblies, for one square meter of the surface of the vertical greenhouse. In this case, it is possible to obtain a distribution of at least PPFD 800 umol/m$^2$, for both spectra with predomination long-wave and short-wave radiation. Said spectra have significantly different physiological activity, and because of this difference, it is customary to utilize two sets of luminaires in the practice of crop production to solve this problem. The present invention provides solutions comprising not only these two said spectra, but also many others, allowing users to obtain further specific responses from plants within greenhouses. Also, the present invention allows users to develop long-term lighting cycles for the entire growing season of a plant. During such long-term lighting cycles, each day of the long-term lighting cycle may comprise a unique daily lighting cycle, set by the user via the controller interface. Studies of the effects of varying spectra, as well as long term lighting cycles, would also be enhanced via applications of the present invention.

It is important to note that both long-wave and short-wave spectra use all parts of the spectrum included in the photosynthetically active radiation (PAR) gap, since only the activation of the entire ensemble of light-harvesting plant complexes allows for greenhouses to achieve their highest efficiency. Since lighting solutions are based on varying organisms and desired outcomes, the present invention allows for further customization of radiations of the LED assemblies, via the controller interface, as described further herein.

Figure 13:
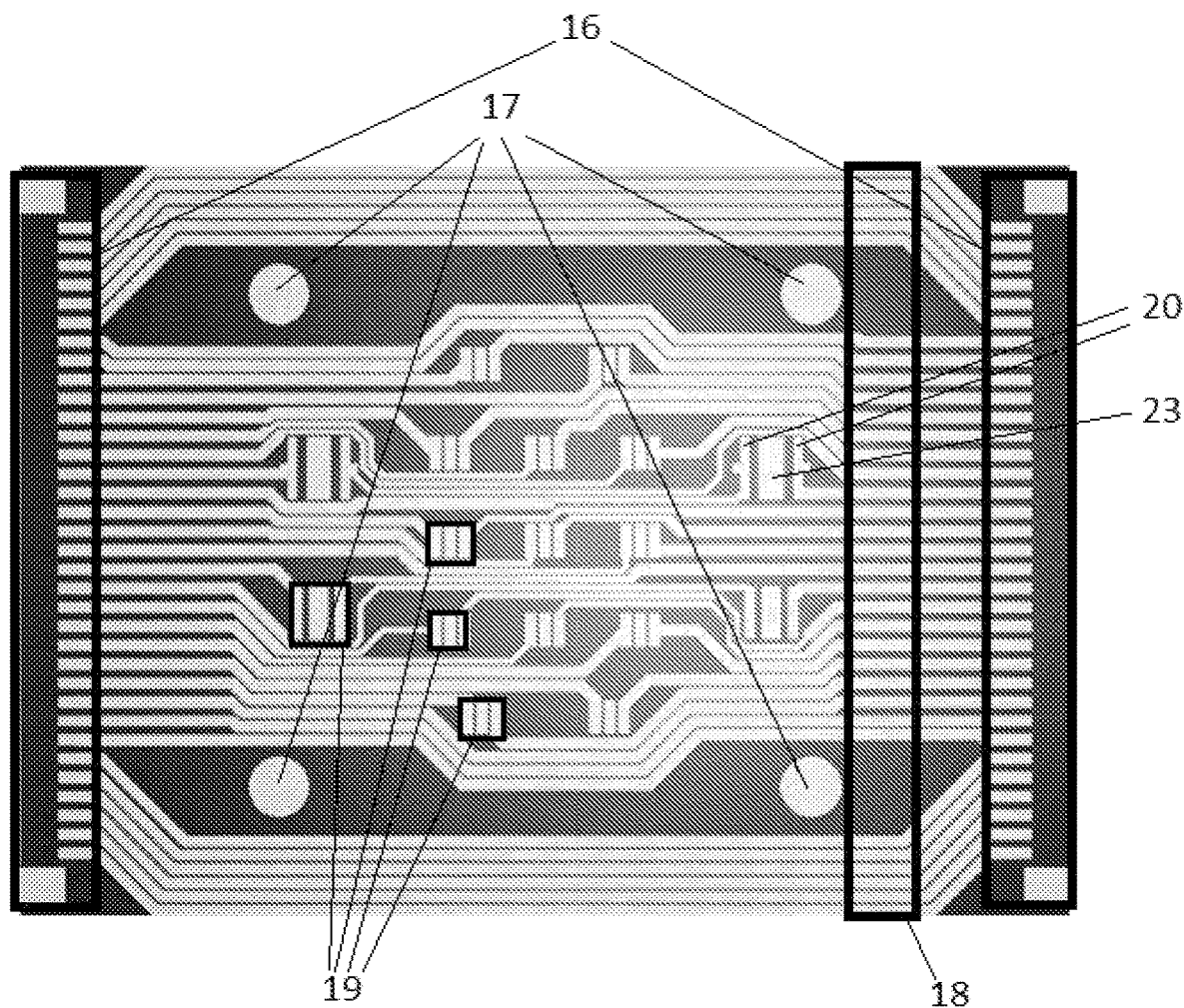
FIG. 13 shows an exemplary circuit board design according to the present invention.

Regardless of the resulting spectrum that is provided via the lamps, each LED assembly comprises a circuit board similar to that shown in FIG. 13. On the extreme left and right of the circuit board are the solder pads of connectors 16, provided for connecting flat power cables 15. The round pads represent locations of holes 17 for screws which secure the LED assembly to a heatsink. Horizontal lines 18 of the circuit board represent power conductors for the individual LED emitters. Locations represented by vertical, closely spaced triples of short segments represent seat locations 19 for varying LED emitters. The outer segments of the spaced triples of short segments are the power contacts 20 for the LED emitters. The middle/inner segment of each of the spaced triples of short segments represent locations for electrically neutral pads 23 which are soldered to said middle/inner segment, at the base of the LED emitter, and located directly under the LED crystal of the LED emitter. Through this design, the majority of the thermal energy created by the LED emission is transferred to the board instead of the surrounding air.

Such a circuit board and LED emitters design allows for forming an LED board without the requirement for any jumpers (i.e. each LED assembly comprises an absence of jumpers). Compare a design comprising an absence of jumpers, per one design of the present invention, against a prior art design for a 14-LED assembly, shown in FIG. 14.

Figure 14:
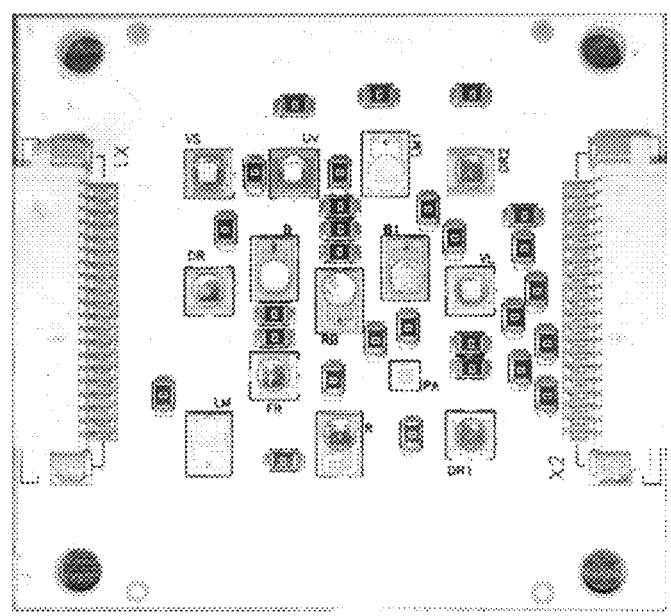
FIG. 14 shows a prior art embodiment of the LED assembly.

As seen in FIG. 14, a large number of jumpers are installed on the board, which carry the following non-exclusive list of potential problems: (1) Reduced reliability of producing the desired spectrum, reduced reliability of full functionality of the device, and increased cost of manufacture due to the greater number of solder points and additional components; (2) Reduction in the amount of total radiation emitted by each LED assembly due to the fact that the jumpers are black in color; and (3) Deterioration of an aesthetically pleasing appearance due to the jumpers.

In the exemplary embodiments of the present invention having 17 LEDs, as well as in other embodiments, the LED assemblies comprise circuit boards comprising direct and reverse conductors (bidirectional conductors), therefore, only one flat power cable is required to connect one LED assembly to the next, in the entire LED luminaire.

The thickness of the copper layer of the circuit board is about 70 microns. Therefore, the width of the copper tracks is maximized in order to minimize the losses caused by the resistance in the conductors. Prior art designers failed to pay due attention to this factor. In the luminaires of the present invention, conductors having a width of 700 microns and a thickness of 100 microns are employed within the flat power cables. With such dimensions of the conductors within the flat power cables, the use of conductors on the actual LED circuit board, most of which have a width of about 600 microns, is justified.

The losses, due to the resistances of conductors, even in such relatively thick conductors, are not negligible in practice. For example, consider a lamp that is 120 cm long, comprising 10 such flat cables with relatively thick copper conductors installed. The maximum consumption of the lamp will be about 500 watts. In this case, the total losses in the conductors will be about 20 watts. This equates to about 4% of the power consumption, which is comparable to the losses in the LED drivers.

Object 4. Providing a Controller Interface for Programming Daily and Long-Term Cycles of Varying Spectra Adjustable, Manageable, and Automatable.

Figure 9:
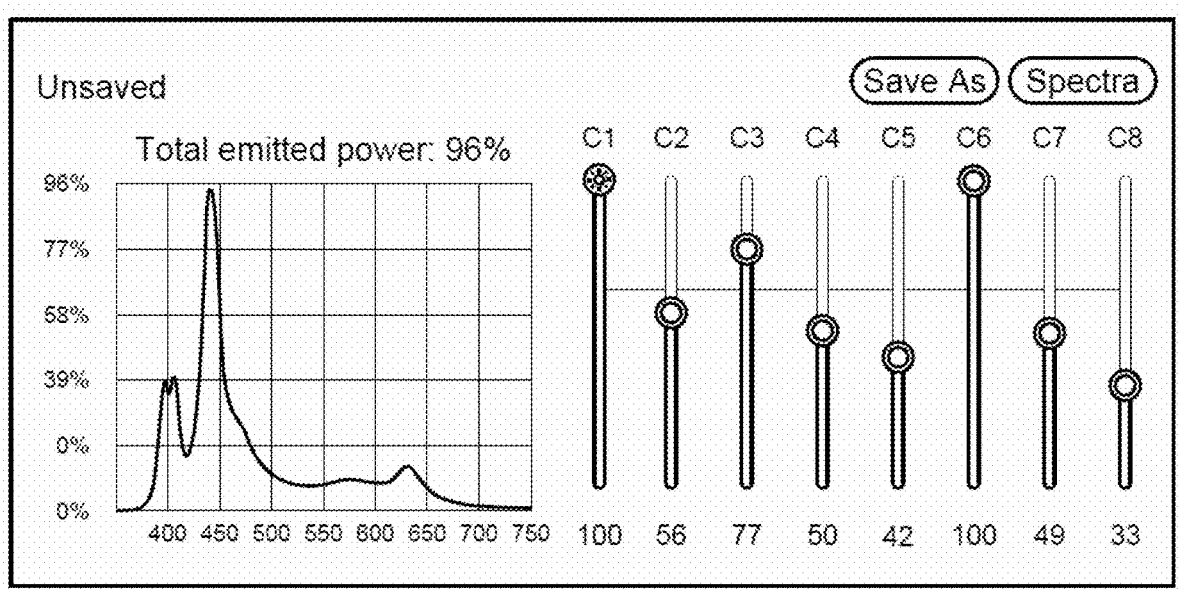
FIG. 9 shows an exemplary view of a top portion of a controller interface according to the present invention.
Figure 10:
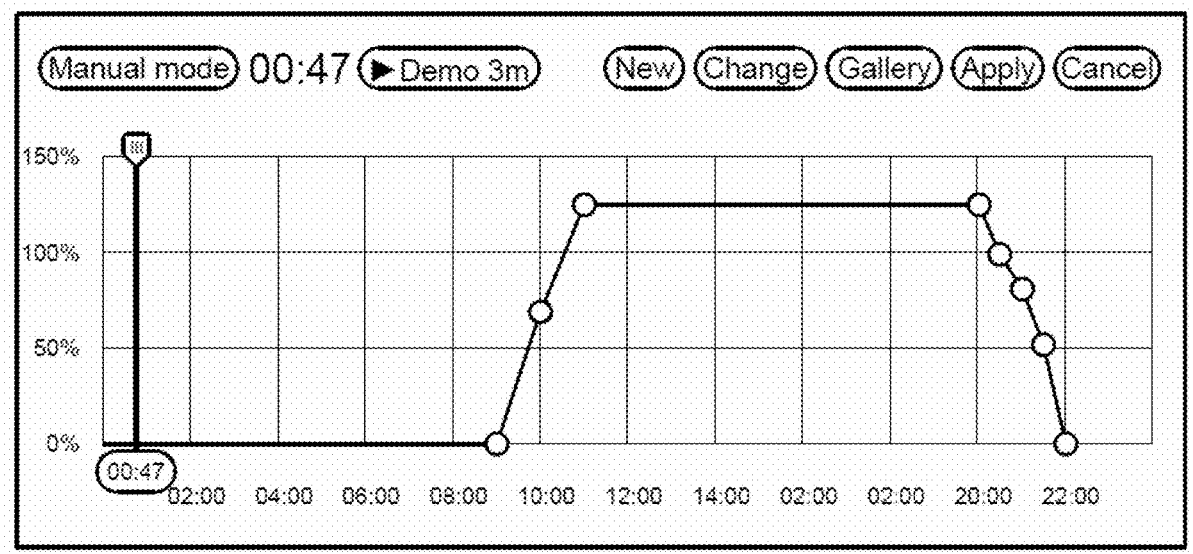
FIG. 10 shows an exemplary view of a lower portion of a controller interface according to the present invention.

The light spectrum is used as the basic logical unit within the controller interface. The user may form the necessary spectrum/spectra by indicating specific wavelengths (i.e. LED channels), setting the true amount of the radiation of each of said specific wavelengths via slider buttons for each of said LED channels, and controlling the resulting spectra in real time and over time according to a suggested spectrum graph provided by the controller interface or by the ideal spectrum otherwise determined based on the type of illuminated object or illuminated area. Personal user/environment spectral preferences may also vary and depend on the emotional and physical states of the user. In treating emotional and/or physical states of the user, the present invention thus provides therapeutic, medicinal, and personally tailorable effects. FIG. 9 shows an exemplary upper portion of the controller interface according to the present invention. After the necessary spectrum is formed via the slider buttons, the user may save the design in the spectra gallery and proceed to the formation of a daily illumination cycle, via interaction with the lower portion of the interface (the lower portion of the interface is shown in FIG. 10).

In the lower portion of the controller interface (i.e. FIG. 10), each point corresponds to a predetermined spectrum, as set via the slider buttons in the upper portion of the interface. The height of a point on the daily chart shown in FIG. 10 is the amount of total true radiation provided by the predetermined spectrum resembled by that point. After graphically depicting the sets of radiation amounts (i.e. spectra) of a daily cycle, the user may save it in a gallery of daily cycles. Long-term cycles of illumination may be formed, e.g., by combining several daily cycles. When graphically depicting long term cycles, however, each point represents a whole daily cycle, said whole daily cycle comprising several of said predetermined spectrums within that daily cycle. The height of each point in long term graphs thus represents a value corresponding to the true amount of radiation emitted per given daily cycle.

The microcomputer, controller, and controller interface of the present invention comprise a uniquely deigned hardware-software system. The system provides a user with complete control over the spectrum and intensity of light via any remote WiFi connection. The controller and controller interface ensure adequate nutrition and the best possible appearance of photosynthetic organisms within the lighting environment. The controller is installed in each luminaire of the present invention.

The controller allows for control of the true amount of radiation (i.e., true radiation) that the photosynthetic organisms receive in the lighting environment. The expert server further assists users to choose the correct number of luminaires and LED assemblies by providing expert suggestions based on a continuously updating database storing previously recorded lighting programs and related information.

Via the controller interface, control of the amount of radiation in common units, such as micromoles of photons per second, is possible to a high degree of accuracy. The microcomputer installed in each lamp solves this task.

The controller includes a standard WiFi access point, connectable from any remote device having a WiFi connection and an internet browser. The controller, being installed locally on the luminaire, further allows for a local device to connect directly to the luminaire without the requirement/need for an internet connection. After connection of the local luminaire controller to an external local router, it becomes possible to control this luminaire (or group of luminaires if to the external router will connected the luminaire, which controller have a Master role over the group of the luminaires), via the Internet. That is, the control of the luminaires is possible both through a local connection, and, if necessary, it is possible to control it remotely via the Internet. Any device that has a WiFi and an Internet browser can be connected to the controller interface. For example, but not limited to: computer, tablet, smartphone, smart TV and so on.

The interface of the controller informs the user who sets the spectrum, the amount of radiation in relative units—a percentage of the maximum possible amount of radiation, or in absolute—micromoles of photons. This information of radiation that is shown above the spectrum graph is the single criterion on which the controller is based. This is because one of the main tasks solved by the lamp is to provide the best nutrition for various types of photosynthetic organisms. For proper nutrition, these organisms need radiation of the entire photosynthetic active radiation (PAR) gap, a significant part of which is poorly visible to the human eye. Since the human eye can only see well the yellow-green part of the spectrum, the user literally cannot see the light that, for example, corals need to thrive. For coral organisms, a significant predominance of the shortwave part of the spectrum is required—a part of the spectrum that is nearly invisible to the human eye. Thus, prior art users are forced to hypothesize the amount of the radiation, emitted of prior art lighting systems because they must determine what they are unable to physically see. The controller interface and controller of the present invention provide a solution to this problem.

The logic of the controller and controller interface provides an extremely simple interface with multistage protection against user errors. The first step of error protection during spectrum creation is to show the user how much true radiation each planned spectrum produces. As discussed above, the amount of true radiation and the visible brightness of the lamp are entirely unrelated values, and they likely comprise different values because of the human eye's narrow range of light detection.

The following suggestions are provided as examples for varying types of lighting environments:

Recommendations for Spectrum formation for marine coral aquariums.

To obtain good coloration and the growth of corals is most important to provide first the necessary amount of true radiation. Adequate amount of the radiation is more important than any spectrum option with insufficient amount of the radiation.

By providing the proper amount of true radiation, there are no spectra that will not provide good growth for corals. Also, there is no spectrum in which corals grow well but do not grow unwanted algae. All spectrum settings are made primarily for the owner of the aquarium to provide the best perception of the aquarium and secondarily the best lighting environment for the corals living in it. The color and appearance of corals depend primarily on the environment conditions (primarily—water quality and the proper balance of all nutrients and microelements) in which they live. If the conditions are not optimal, even the best spectrum will not produce ideal results.

It is important to note that if an environment has received little true radiation in the past, increasing the true radiation should be performed gradually, comprising preferably no more than a 5% change per day. A proper amount of radiation is achieved when the controller interface shows a value of Total Emitted Power, which will be similar to that recommended via the expert server, also based on the total number of luminaires. Additional true radiation should only be experimented with if a user thoroughly understands what other conditions must be maintained in the marine aquarium when using greater-than-recommended amounts of true radiation. The capabilities of the expert server, including in terms of adaptation modes, are continuously updated to best fulfill the tasks of users.

The following rules comprise the logic for the exemplary marine coral environment:

Rule 1. Length of daylight hours should be approximately 10 hours, with the true radiation comprising an amount as specified by the expert server. Dawn and dusk should be simulated as about one hour at minimum, and at maximum two hours. In any case, the total duration of daylight hours should not exceed 14 hours.

Rule 2. Ensure that there is sufficient short-wave radiation emitted within the range between 400 nm and 500 nm. Shortwave radiation comprises the violet, royal blue, blue and cyan channels shown in the controller interface. These channels should collect no less than 2/3, and no more than 9/10, of the radiation of any spectrum that is set for the marine coral aquarium. For example, if the Total Emitted Power of an entire spectrum is 40%, these four channels as a whole should emit at least 25%, and no more than 36%, of the true radiation resulting from the entire spectrum.

Rule 3. If employing an amount of true radiation that is close to the limit suggested via the expert server, a significant amount of radiation from medium-wave and long-wave portions of the spectrum must also be used. The medium-wave portions of the spectrum (i.e., from cyan to yellow) should provide no less than 10% of the total true radiation (total emitted power). The long-wave portions of the spectrum (i.e., from orange to red) should provide no less than 3% of the total true radiation. For example, if Total Emitted Power is 70%, the medium-wave portions of the spectrum should be represented in an amount of no less than 7% of the total, and the long-wave portions should be represented in an amount of no less than 2.1% of the total.

Rule 4. The blue channel may be provided with as much intensity as a user desires for any coral. The royal blue channel should be provided and modified based on what type of corals are present and what kind of light they have received prior. For example, for shallow corals and those that have been kept under a lighting system comprising little royal blue, it is necessary to gradually adapt the environment when switching to a new spectrum comprising a large amount of royal blue. The violet channel is similar in properties to the royal blue channel, but requires even more careful attention, especially if the so-called soft and LPS corals predominate in the aquarium. The more short-wave radiation, i.e., the more royal blue radiation and especially the more violet radiation in the spectrum, the higher the probability that the corals, which are capable of producing the chromoproteins needed to assimilate this radiation, will produce such chromoproteins in larger quantities. Therefore, the more violet, the more likely it is that the coral that can adapt to this spectrum will become brighter. Any changes must always be performed gradually with using the controller capabilities.

Recommendations for spectrum formation in freshwater aquariums.

To obtain good growth and coloration of plants, they require first of all a proper quantity of true radiation.

It is important to note that if an environment has received little true radiation in the past, increasing the true radiation should be performed gradually, comprising preferably no more than a 5% change per day. A proper amount of radiation is achieved when the controller interface shows a value of Total Emitted Power, which will be similar to that recommended via the expert server, also based on the total number of luminaires. Additional true radiation should only be experimented with if a user thoroughly understands what other conditions must be maintained in the marine aquarium when using greater-than-recommended amounts of true radiation. The capabilities of the expert server, including in terms of adaptation modes, are continuously updated to best fulfill the tasks of users.

The following rules comprise the logic for this exemplary freshwater aquatic environment:

Rule 1. Length of daylight hours should be approximately 10 hours, with the true radiation comprising an amount as specified by the expert server. Dawn and dusk should be simulated as about one hour at minimum, and at maximum two hours. In any case, the total duration of daylight time should not exceed 14 hours.

Rule 2. If the user desires to achieve near-optimal coloration, growth rates, the spectrum designed should not differ drastically from the typical natural midday spectrum.

Rule 3. Spectra which are far from a typical natural midday spectrum may be employed for 0.5 hour to 1 hour in the morning simulation, and for 1 hour to 2 hours in the evening simulation. Morning spectra should be dominated by the long-wave (orange-red) portions of the spectrum, and evening spectra should be dominated by the short-wave (turquoise, blue, and violet) portions of the spectrum.

Rule 4. The violet portion of the spectrum is essential for aquatic plants. However, some plant species are highly sensitive to said violet portion of the spectrum. Therefore, a user should starting of using this portion of the resulting spectrum, in an amount not exceeding one quarter of the light emitted by the blue and the royal blue channels within the same spectrum.

The controller interface is designed either as a remote website (via the world wide web) or a local website (via a local connection, e.g., not requiring an internet connection), which is accessible from any device that has minimal connectivity specifications, in order to access and control the microcomputer within the lamp, said microcomputer in turn controlling the controller of the lamp, said controller, in turn, setting the true radiation emitted by each LED emitter of each LED assembly connected to said microcomputer and said controller.

The microcomputer preferably incorporates a full-fledged Linux-core based operating system (OS), which performs many unique functions, i.e., the calculation in real time of the amount of lamp radiation, both in watts and in micromoles of photons, the calculation of the total daily amount of radiation, and the amount of radiation over a long cycle. Having a Linux OS also makes it possible to calibrate the spectrum of the luminaire to eliminate natural fluctuations in the spectrum which are inherent in certain LEDs as a result of their binning, thus further increasing the ability to form a uniformly distributed desired spectrum. Furthermore, a Linux OS provides the ability to use high-level languages and calls to create and analyze controller functions, and to form custom actions that a standard interface does not provide.

The controller interface also allows for grouping of several luminaires (lighting systems/lighting devices) into groups, said groups having a hierarchy or otherwise dynamic connection to one another. The controller interface further allows for controlling a luminaire or a group of luminaires from any internet-accessible remote location.

Object 5. Each lamp (i.e., device, light system) comprises a set of compact light sources (i.e., LED assemblies), a driver assembly, a microcontroller, and a microcomputer, each of the compact light sources being controlled synergistically via the controller interface (i.e. software) of the invention, the software simultaneously modifying the light, emitted from each compact light source, per user and/or lighting program preferences, via said microcontroller and said microcomputer.

Figure 11:
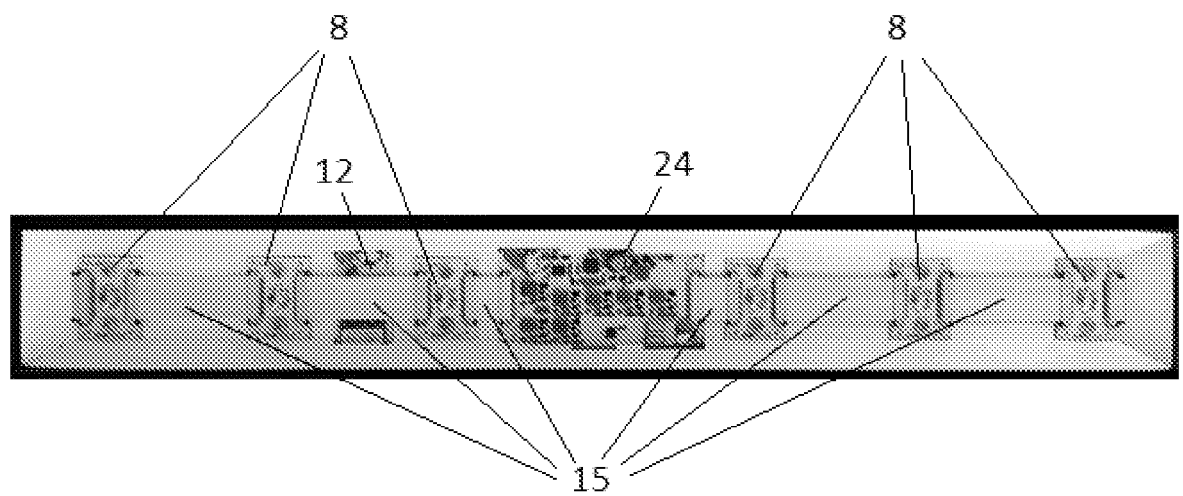
FIG. 11 shows an exemplary lamp/device according to the present invention.

FIG. 11 shows an exemplary view of the internal design of a lamp according to the present invention (however, with the frame and diffuser removed).

Figure 12:
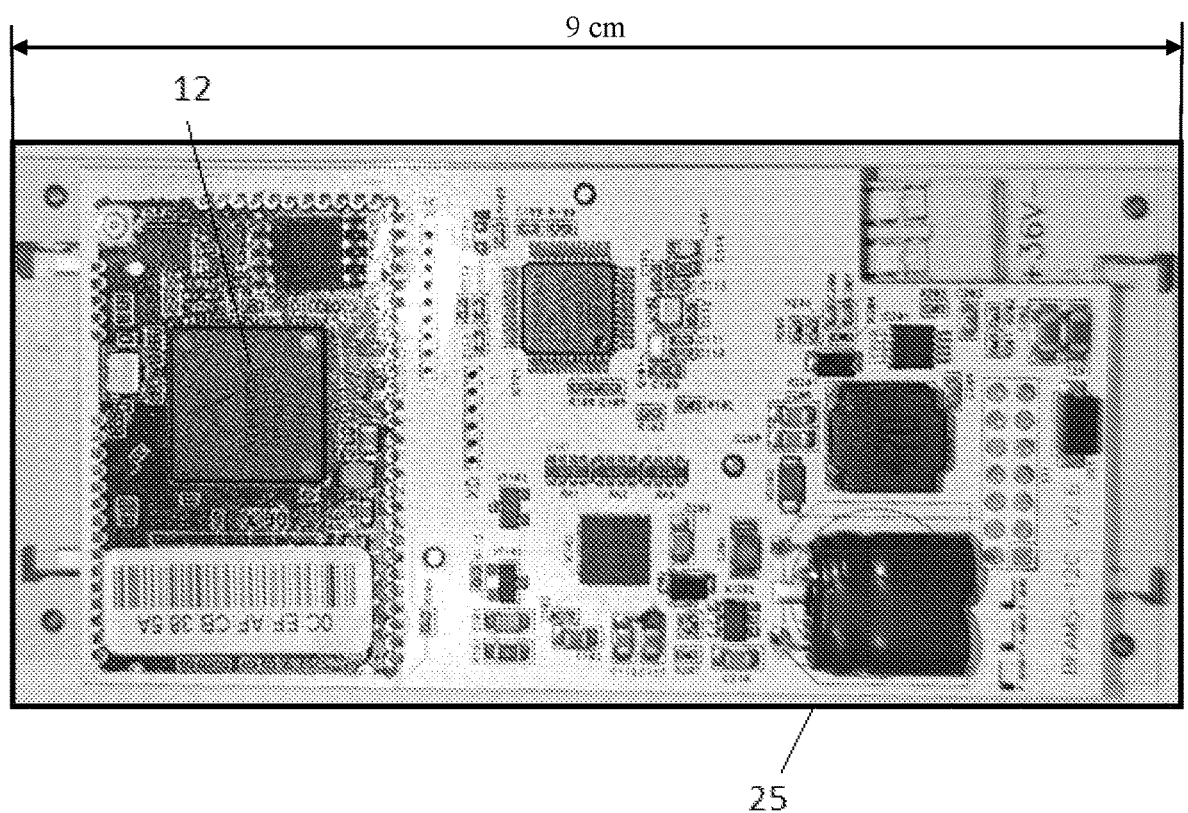
FIG. 12 shows an exemplary embodiment of a single compact circuit board according to the present invention.

As shown in FIG. 11, in the middle of the lamp is the driver assembly 24, the driver assembly comprising several drivers (at least one for each LED channel) and a microcomputer 12, wherein said microcomputer 12 is placed on a separate module on a left side of the lamp, between two LED assemblies 8. The separate module may similarly be placed on a right side of the lamp in other embodiments. Yet another embodiment of a lamp system comprises all of the above elements, including the microcomputer 12, on a single compact circuit board 25 instead of two separate modules, as illustrated, for example, in FIG. 12.

Continuing with FIG. 11, to the right and left of the driver assembly 24, LED assemblies 8 are connected to the driver assembly by flat power cables 15. All structural elements, and any added components of the lamp, are preferably colored white to minimize light loss inside the lamp.

The number of LED assemblies in one fixture depends only on the types of drivers used. The number of LED assemblies may reach, for example, 10 LED assemblies to hundreds of LED assemblies, connected together, forming a lighting system according to the present invention.

The number of control channels in exemplary embodiments of the present invention is up to 12 separate LED channels (i.e. 12 LED channels emitting different and distinguishable wavelengths). Having up to 12 separate LED channels allows for a simulation of any spectrum within the full visible range with higher accuracy than achievable by prior art systems.

If more LED channels are desired, it is possible to use several controllers within a single lighting system, such that the resulting spectrum is represented by more than 12 separate LED channels simultaneously. Theoretically, unlimited expansion and/or scalability of LED channels is possible by extrapolating the techniques discussed herein.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A lighting device, comprising:
   a driver assembly comprising five or more drivers, wherein an amount of said drivers is at least equal to an amount of total LED channels,
   at least five unique LED channels,
   a microcomputer,
   a microcontroller,
   and
   one or more LED assemblies connected to said driver assembly, each of said one or more LED assemblies comprising:
   a single circuit board,
   at least five LED emitters, each of said at least five LED emitters emitting a unique spectrum relative to all other LED emitters of said LED emitters,
   each of said at least five LED emitters being positioned around a center of said circuit board, and
   a controller interface installed on said microcomputer, said microcomputer transmitting to said microcontroller directions for controlling one or more of said five or more drivers of said driver assembly, said controller interface providing a control of a uniform spectrum distribution of said lighting device, said controller interface providing for modifications of:
   a length of a period of light emitted by any one of said at least five LED emitters, and/or
   an electric current amount on any one said at least five LED emitters.

2. The device of claim 1, each of said one or more LED assemblies comprising 12 unique LED emitters.

3. The device of claim 2, each of said one or more LED assemblies comprising 17 total LED emitters.

4. The device of claim 1, further comprising a non-emitting center, said non-emitting center being between 50 and 200 millimeters in width.

5. The device of claim 1, wherein said single circuit LED board comprises an array of seat locations for said LED emitters, each seat location comprising a set of 3 spaced segments, said 3 spaced segments being soldered to corresponding LED pads, wherein outer segments of said 3 spaced segments comprise power contacts for a given one of said at least five LED emitters, and wherein inner segments of said 3 spaced segments are electrically neutral pads.

6. The device of claim 1, wherein the microcomputer comprises a Linux operating system.

7. The device of claim 1, wherein the controller interface provides for a modification to a daily cycle.

8. The device of claim 1, wherein the controller interface provides for a modification to a long-term cycle.

9. The device of claim 1, wherein the controller interface provides an upper portion and a lower portion, said upper portion illustrating a single set spectrum out of all set spectrums from a given cycle, said lower portion graphically displaying a change in an amount of optical radiation emitted between each consecutive one of all set spectrums from a given cycle.

10. The device of claim 1, wherein the controller interface provides an overall true optical radiation value, said overall true optical radiation value corresponding to a given set spectrum.

11. The device of claim 1, wherein each one of said LED assemblies comprises an absence of jumpers.

12. The device of claim 1, further comprising flat power cables, said flat power cables comprising conductors, said conductors having a width of 700 microns and a thickness of 100 microns.

13. The device of claim 1, wherein the controller interface provides a total true radiation amount, said total true radiation amount is the result of calculation of amount of optical radiation of all wavelengths emitted in created given user-set spectrum.

14. The device of claim 1, wherein the controller interface provides for a setting of daily cycles.

15. The device of claim 1, wherein the controller interface provides for a setting of a long-term cycle, said long-term cycle comprising one or more daily cycles.

16. The device of claim 1, further comprising a hybrid dimming, said hybrid dimming comprising pulse wave modulation (PWM) and constant current reduction (CCR).

17. The device of claim 16, wherein said PWM of said hybrid dimming occurs only in modes comprising near-zero amounts of radiation.

18. The device of claim 1, wherein said LED emitters form a circular spaced area on each of said LED assemblies.

19. The device of claim 1, further comprising a local connection setting, said local connection setting providing a connectivity to said device via said controller interface in an absence of internet access.

20. A system of lighting devices, the system comprising two or more lighting devices according to claim 1, said two or more lighting devices being connected, said two or more lighting devices having a hierarchy.

* * * * *